United States Patent
Shimizu et al.

(10) Patent No.: US 7,363,391 B2
(45) Date of Patent: Apr. 22, 2008

(54) STORAGE SYSTEM FOR QUEUING I/O COMMANDS AND CONTROL METHOD THEREFOR

(75) Inventors: Akira Shimizu, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 11/403,846

(22) Filed: Apr. 14, 2006

(65) Prior Publication Data

US 2007/0239902 A1   Oct. 11, 2007

(30) Foreign Application Priority Data

Mar. 2, 2006   (JP) .............................. 2006-056358

(51) Int. Cl.
*G06F 3/00* (2006.01)
*G06F 12/00* (2006.01)

(52) U.S. Cl. .............................. 710/5; 710/39; 711/111; 711/154

(58) Field of Classification Search ................ 710/5–7, 710/36–39, 52–57; 711/111–116, 154, 167
See application file for complete search history.

(56) References Cited

U.S. PATENT DOCUMENTS

| | | | | |
|---|---|---|---|---|
| 5,548,795 A | * | 8/1996 | Au .............................. | 710/52 |
| 5,890,208 A | * | 3/1999 | Kwon ......................... | 711/112 |
| 6,112,265 A | * | 8/2000 | Harriman et al. .............. | 710/40 |
| 6,272,565 B1 | * | 8/2001 | Lamberts ...................... | 710/43 |
| 6,490,635 B1 | * | 12/2002 | Holmes ......................... | 710/3 |
| 6,553,454 B1 | * | 4/2003 | Harada ........................ | 711/111 |
| 6,851,011 B2 | * | 2/2005 | Lin ................................ | 711/4 |
| 2006/0106980 A1 | * | 5/2006 | Kobayashi et al. ......... | 711/113 |
| 2006/0271739 A1 | * | 11/2006 | Tsai et al. ................... | 711/123 |

FOREIGN PATENT DOCUMENTS

JP            06-259198           9/1994

* cited by examiner

*Primary Examiner*—Christoher Shin
(74) *Attorney, Agent, or Firm*—Mattingly, Stanger, Malur & Brundidge, P.C.

(57) ABSTRACT

A conventional storage system immediately executes a received I/O command because of importance of response time. Provided is a storage system which is coupled to a network and executes an I/O command received from at least one host computer through the network, in which: the storage system holds judgment information including predetermined conditions set therein, and upon reception of the I/O command, the processor judges whether the received I/O command satisfies the predetermined conditions or not based on the judgment information, queues a plurality of I/O commands that satisfy the predetermined conditions, rearranges the plurality of queued I/O commands, executes the plurality of queued I/O commands in a rearranged order, and executes I/O commands that do not satisfy the predetermined conditions in a received order.

20 Claims, 15 Drawing Sheets

QUEUING PERMISSION JUDGMENT TABLE 301

| ITEM NUMBER | HOST LU NUMBER | LBA | SIZE |
|---|---|---|---|
| 1 | 1 | * | * |
| 2 | 2 | 0 | 128 |

*FIG. 3*

QUEUING PERMISSION JUDGMENT TABLE SETTING SCREEN 401

MANAGEMENT TOOL: THROUGHPUT PRIORITY SETTING

AREA DESIGNATION / DETAIL SETTING

HOST LU NUMBER: 2
LBA: 0
SIZE: 128

| ITEM NUMBER | HOST LU NUMBER | LBA | SIZE |
|---|---|---|---|
| 1 | 1 | * | * |
| 2 | 2 | 0 | 128 |
|  |  |  |  |
|  |  |  |  |

LOAD  SAVE  DELETE

*FIG. 4*

QUEUING MANAGEMENT TABLE 601

| ITEM NUMBER (611) | TIME (612) | NUMBER OF COMMANDS (613) |
|---|---|---|
| 1 | 10 ms | — |
| * | — | 16 |

FIG. 6

QUEUING MANAGEMENT TABLE SETTING SCREEN 701

MANAGEMENT TOOL: THROUGHPUT PRIORITY SETTING

AREA DESIGNATION / DETAIL SETTING

ITEM NUMBER
711 — 1

TIME (ms)
712 — 10

NUMBER OF COMMANDS
713 —

714:

| ITEM NUMBER | TIME | NUMBER OF COMMANDS |
|---|---|---|
| 1 | 10 ms | — |
| * | — | 16 |
|  |  |  |
|  |  |  |
|  |  |  |

LOAD (715)   SAVE (716)   DELETE (717)

FIG. 7

QUEUING PERMISSION JUDGMENT TABLE 801

| ITEM NUMBER 811 | WWN 812 | HOST LU NUMBER 813 |
|---|---|---|
| 1 | 01:02:03:04:05:06:07:08 | * |
| 2 | 01:02:03:04:05:06:07:09 | 0 |

FIG. 8

QUEUING PERMISSION JUDGMENT TABLE SETTING SCREEN 901

MANAGEMENT TOOL: THROUGHPUT PRIORITY SETTING

REQUEST SOURCE DESIGNATION / DETAIL SETTING

WWN
911 — 01:02:03:04:05:06:07:09

HOST LU NUMBER
0 — 912

913

| ITEM NUMBER | WWN | HOST LU NUMBER |
|---|---|---|
| 1 | 01:02:03:04:05:06:07:08 | * |
| 2 | 01:02:03:04:05:06:07:09 | 0 |
|  |  |  |
|  |  |  |

LOAD (914)　SAVE (915)　DELETE (916)

FIG. 9

QUEUING PERMISSION JUDGMENT TABLE 1101

| ITEM NUMBER (1111) | HOST LU NUMBER (1112) | PRIORITY (1113) | RANGE CONDITION (1114) |
|---|---|---|---|
| 1 | 10 | 09 | EQUAL OR LESS |
| 2 | * | 15 | EQUAL |

FIG. 11

QUEUING PERMISSION JUDGMENT TABLE SETTING SCREEN 1201

MANAGEMENT TOOL: THROUGHPUT PRIORITY SETTING

PRIORITY DESIGNATION / DETAIL SETTING

1211 HOST LU NUMBER: 10    1212 PRIORITY: 09    1213 EQUAL OR LESS    1214

| ITEM NUMBER | HOST LU NUMBER | PRIORITY | RANGE CONDITION |
|---|---|---|---|
| 1 | 10 | 09 | EQUAL OR LESS |
| 2 | * | 15 | EQUAL |
|  |  |  |  |
|  |  |  |  |

LOAD (1215)    SAVE (1216)    DELETE (1217)

FIG. 12

QUEUING PERMISSION JUDGMENT TABLE 1601

| ITEM NUMBER 1611 | HOST LU NUMBER 1612 | LU NUMBER 1613 |
|---|---|---|
| 1 | 11 | 1 |
| 2 | 12 | 2 |

FIG. 16

QUEUING PERMISSION JUDGMENT TABLE SETTING SCREEN 1701

MANAGEMENT TOOL : THROUGHPUT PRIORITY SETTING

LU CREATION / DETAIL SETTING

HOST LU NUMBER 1711: 12   LU NUMBER 1712: 2    — 1713

| ITEM NUMBER | HOST LU NUMBER | LU NUMBER |
|---|---|---|
| 1 | 11 | 1 |
| 2 | 12 | 2 |
|   |   |   |
|   |   |   |

LOAD 1714   SAVE 1715   DELETE 1716

FIG. 17

STORAGE SYSTEM FOR QUEUING I/O COMMANDS AND CONTROL METHOD THEREFOR

CLAIM OF PRIORITY

The present application claims priority from Japanese application JP2006-56358 filed on Mar. 2, 2006, the content of which is hereby incorporated by reference into this application.

BACKGROUND

This invention relates to an improvement in performance of a storage system, and more particularly, to a technology for controlling queuing of I/O commands to realize optimal performance.

In a storage system, upon reception of an I/O command from a host computer, data is written in or read from a disk drive according to the I/O command. When the storage system receives a next I/O command before the execution of the I/O command is finished, the received I/O command is temporarily stored in a FIFO type memory to wait for execution. Storing of one or more I/O commands in the memory to wait for execution as described above is called queuing of I/O commands. When a plurality of I/O commands wait for execution, the I/O commands may be rearranged to be executed in an order different from the received order, which may shorten time necessary for execution. For example, JP 06-259198 A discloses a technology for rearranging I/O commands such that head seek time or rotational delay of a disk drive can be minimum, to thereby shorten execution time of the I/O commands.

SUMMARY

The conventional storage system described above, which puts priority on shortening of response time, executes an I/O command immediately after receiving the I/O command from the host computer. Only when execution waiting of I/O commands occurs, e.g., when a great many I/O commands are received in a short period of time, the rearrangement of the execution order of the I/O commands as described above is carried out.

However, in recent years, an amount of data managed by a computer has been increased explosively, which has brought about an increase in a data amount in the storage system accessed by a program. Program performance of accessing a large amount of data depends on throughput to a larger degree rather than on response time. To improve the throughput, it is preferable to actively execute queuing to store a large amount of I/O commands and execute the I/O commands by rearranging the order thereof, even when the I/O command can be immediately executed. On the other hand, depending on a program type or its execution situation, response time may be required to be shortened. In such a case, it is preferable to immediately execute the received I/O command without queuing. However, the conventional storage system has been incapable of identifying I/O commands to be targeted for queuing, and actively executing queuing.

According to a representative embodiment of this invention, a storage system which is coupled to a network and executes an I/O command received from at least one host computer through the network is characterized by including: a host interface coupled to the network; a processor coupled to the host interface; a memory coupled to the processor; and a storage device in which data is read or written according to the I/O command, in which: the storage system holds judgment information including predetermined conditions set therein; upon reception of the I/O command, the processor judges whether the received I/O command satisfies the predetermined conditions or not based on the judgment information; the processor queues a plurality of I/O commands that satisfy the predetermined conditions; the processor rearranges the plurality of queued I/O commands; the processor executes the plurality of queued I/O commands in a rearranged order; and the processor executes I/O commands that do not satisfy the predetermined conditions in a received order.

According to the embodiment of this invention, a system administrator or the host computer can set the storage system to execute queuing of the I/O commands for processing which requires high throughput. As a result, it is possible to improve throughput for optional processing.

BRIEF DESCRIPTION OF THE DRAWINGS

FIG. 3 is an explanatory diagram of a queuing permission judgment table according to the first embodiment of this invention.

FIG. 4 is an explanatory diagram of a queuing permission judgment table setting screen according to the first embodiment of this invention.

FIG. 6 is an explanatory diagram of a queuing management table according to the first embodiment of this invention.

FIG. 7 is an explanatory diagram of a queuing management table setting screen according to the first embodiment of this invention.

FIG. 8 is an explanatory diagram of a queuing permission judgment table according to a second embodiment of this invention.

FIG. 9 is an explanatory diagram of a queuing permission judgment table setting screen according to the second embodiment of this invention.

FIG. 11 is an explanatory diagram of a queuing permission judgment table according to a third embodiment of this invention.

FIG. 12 is an explanatory diagram of a queuing permission judgment table setting screen according to the third embodiment of this invention.

FIG. 16 is an explanatory diagram of a queuing permission judgment table according to a fifth embodiment of this invention.

FIG. 17 is an explanatory diagram of a queuing permission judgment table setting screen according to the fifth embodiment of this invention.

DETAILED DESCRIPTION OF THE PREFERRED EMBODIMENTS

The preferred embodiments of this invention will be described with reference to the accompanying drawings. First, an outline of each embodiment will be given. The embodiments are different from each other in methods of judging whether an I/O command received from a host computer is a queuing target or not.

According to a first embodiment of this invention, judgment is made as to whether a received I/O command is a queuing target or not based on an area designated by the I/O command (i.e., area of data writing or reading target). Specifically, a system administrator assigns an I/O queuing attribute to a predetermined range of an area for storing data (e.g., a part of a predetermined logical unit or an entire logical unit) beforehand. A host computer issues an I/O command which designates a predetermined area as a data writing or reading target. A storage system that has received the I/O command judges that the I/O command is a queuing target when the area designated by the I/O command has an I/O queuing attribute assigned thereto. The storage system causes the I/O command judged to be a queuing target to queue. In other words, the storage system stores a plurality of I/O commands judged to be queuing targets to wait for execution. The storage system rearranges the stored I/O commands to shorten their execution time, and then executes writing or reading in/from the designated area.

According to a second embodiment of this invention, judgment is made as to whether a received I/O command is a queuing target or not based on a host computer which has issued the I/O command. Specifically, when the host computer that has issued the I/O command is a predetermined host computer, the I/O command is judged to be a queuing target.

According to a third embodiment of this invention, judgment is made as to whether a received I/O command is a queuing target or not based on priority set on the I/O command.

According to a fourth embodiment of this invention, control is executed as to execution of queuing by a queuing command and a releasing command. Specifically, a storage system judges that an I/O command received from reception of the queuing command to reception of the releasing command is a queuing target.

According to a fifth embodiment of this invention, judgment is made as to whether a received I/O command is a queuing target or not based on a logical unit (LU) designated by a host computer. Specifically, one LU is provided as two LU's, i.e., an LU of a queuing target (i.e., queuing LU) and an LU which is not a queuing target (i.e., LU to be immediately executed), to the host computer. When the host computer issues an I/O command having a queuing LU designated, the I/O command is judged to be a queuing target.

Next, each embodiment will be described below in detail.

Figure 1:
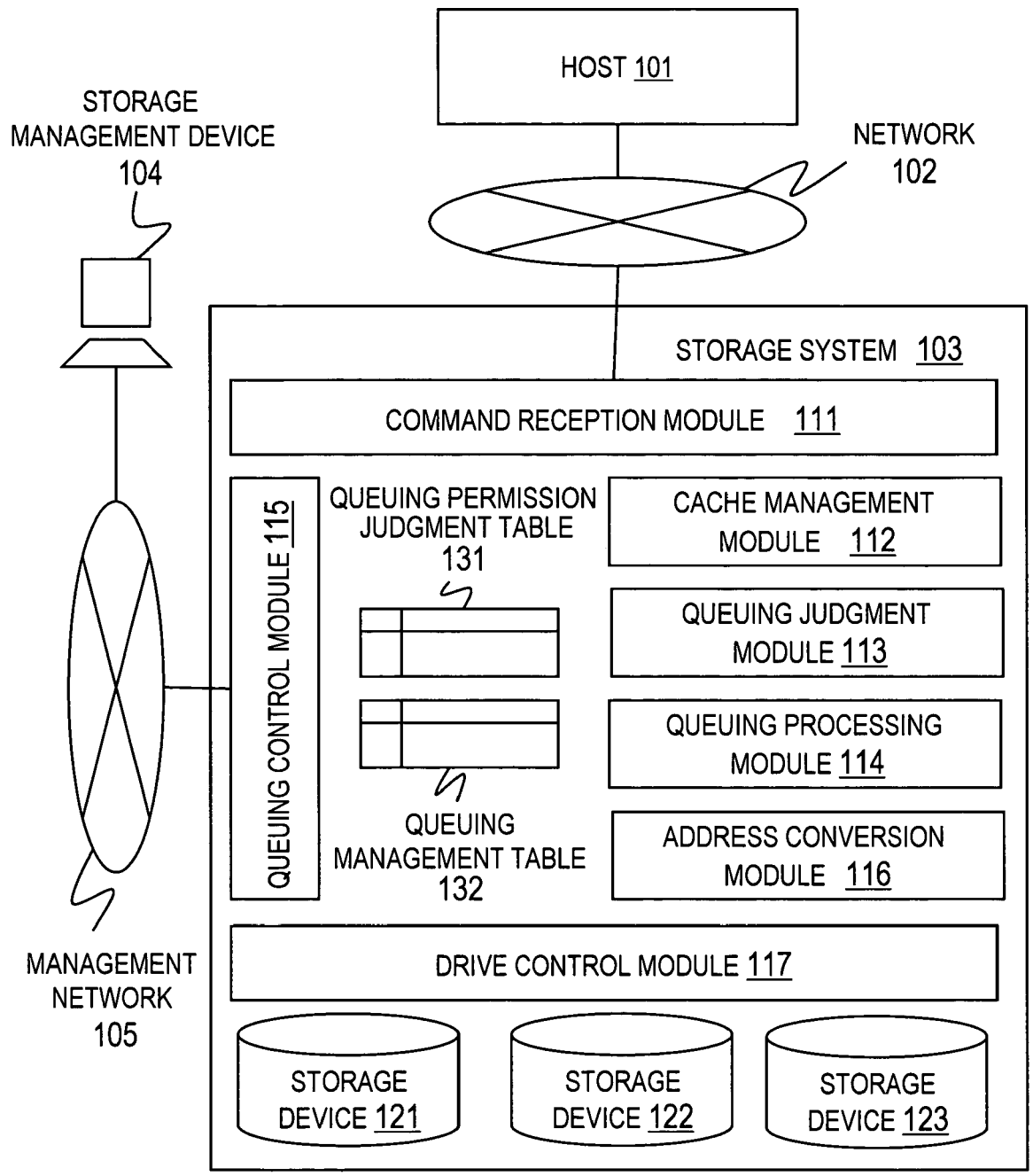
FIG. 1 is a block diagram showing a configuration of a computer system according to a first embodiment of this invention.

FIG. 1 is a block diagram showing a configuration of a computer system according to the first embodiment of this invention.

The computer system of the embodiment includes a host 101, a storage system 103, and a storage management device 104. The host 101 and the storage system 103 are connected to each other through a network 102. The storage management device 104 and the storage system 103 are connected to each other through a management network 105.

The host 101 is a computer which uses the storage system 103. Specifically, the host 101 includes a memory (not shown) for storing an application program, a processor (not shown) for executing the application program, and an interface (not shown) for connecting the host 101 to the network 102. When the network 102 is a storage area network (SAN), the interface may be so-called a Host Bus Adaptor (HBA). The application program issues a data I/O command to the storage system 103 when necessary.

For example, the network 102 is a storage area network (SAN) to which a fibre channel (FC) protocol is applied. However, any type of network may be used. For example, the network 102 may be an Internet protocol (IP) network, and the host 101 and the storage system 103 may communicate by an iSCSI protocol.

The storage system 103 writes or reads data according to the I/O command received from the host 101. The storage system 103 of the embodiment includes a command reception module 111, a cache management module 112, a queuing judgment module 113, a queuing processing module 114, a queuing control module 115, an address conversion module 116, a drive control module 117, a queuing permission judgment table 131, a queuing management table 132, and storage devices 121 to 123.

As described below referring to FIG. 20, the command reception module 111, the cache management module 112, the queuing judgment module 113, the queuing processing module 114, the queuing control module 115, the address conversion module 116, and the drive control module 117 are programs stored in a memory 142 to be executed by a processor 141. Thus, in the description below, processing executed by each module is actually executed by the processor 141. The queuing permission judgment table 131 and the queuing management table 132 are stored in the memory 142 to be referred to by the programs.

The command reception module 111 receives the I/O command from the host 101 through the network 102.

Figure 19:
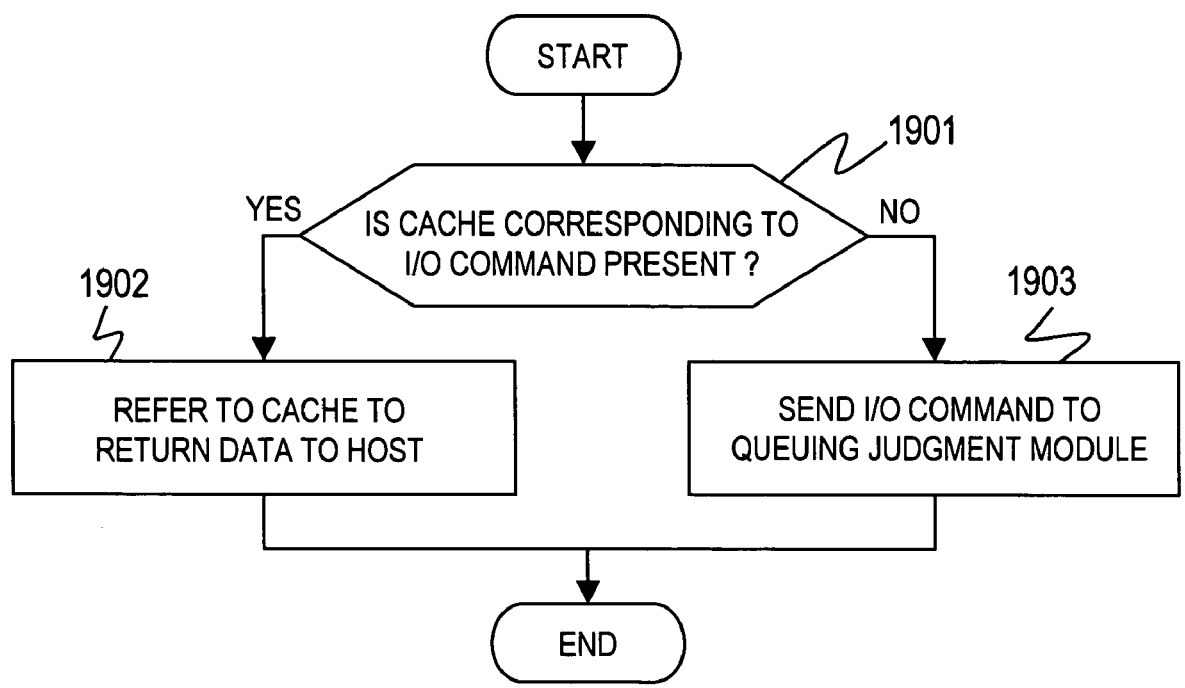
FIG. 19 is a flowchart showing a process executed by a cache management module according to the first embodiment of this invention.
Figure 20:
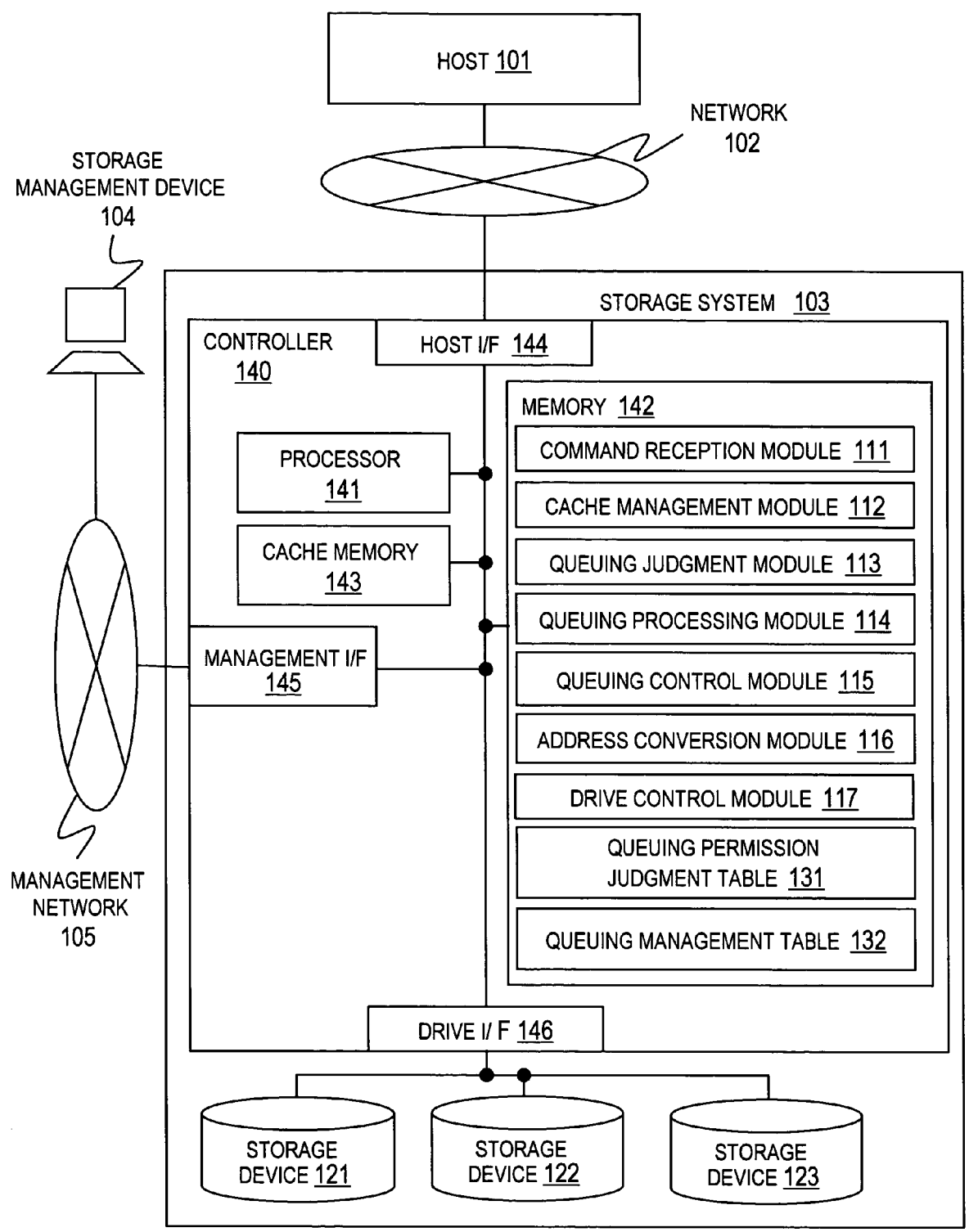
FIG. 20 is a block diagram showing a hardware configuration of a storage system according to the first embodiment of this invention.

The cache management module 112 manages a cache memory 143 shown in FIG. 20 in the storage system 103. Specifically, the cache management module 112 executes a cache hit judgment of an I/O command shown in FIG. 19. A storage system 103 that includes no cache memory 143 does not include a cache management module 112. This invention can be implemented by such the storage system 103.

The queuing judgment module 113 refers to the queuing permission judgment table 131 to judge whether or not to execute queuing for the I/O command.

The queuing processing module 114 executes queuing for I/O commands according to contents of the queuing management table 132, and rearranges the I/O commands to minimize time necessary for execution. This rearrangement may be executed by the same method as that of the conventional case as described below.

The queuing control module 115 sets the queuing permission judgment table 131 and the queuing management table 132 according to an instruction received from the storage management device 104.

The address conversion module 116 converts an address designated by an I/O command into a real address (i.e. a physical address) in the storage device 121 or the like. The I/O command designates a data writing or reading target by a virtual address (e.g., logical unit number (LUN)). The address conversion module 116 converts the LUN or the like into a physical address. When the I/O command directly designates a physical address, the address conversion module 116 may not be necessary.

The drive control module 117 executes data writing or reading in the storage device 121 or the like.

The storage devices 121 to 123 store data written by I/O commands. The storage device 121 or the like may be a hard disk drive (HDD), an optical disk drive, a semiconductor memory device, or another storage device. FIG. 1 shows three storage devices 121 and the like. However, the storage system 103 can include an optional number of storage devices. The plurality of storage devices 121 and the like may constitute a disk array.

A storage area such as the storage device 121 is recognized as a virtual storage area by the host 101. For example, the virtual storage area is a volume group (VG) or a logical unit (LU). The VG is a constituting unit of a disk array. Normally, one VG includes a plurality of storage devices 121 and the like. The logical unit is an area virtually recognized as one storage device by the host 101. One logical unit may correspond to one storage device 121 or the like, a part of the storage device 121 or a plurality of storage devices 121 or the like. Alternatively, the host 101 may directly recognize each storage device 121 or the like.

The storage management device 104 is a computer for controlling the storage system 103 through the management network 105. Specifically, the storage management device 104 transmits an instruction of setting the queuing permission judgment table 131 and the queuing management table 132 to the queuing control module 115.

The storage management device 104 includes a display (not shown) for displaying a management screen to the system administrator, and an input device (not shown) through which the system administrator inputs various instructions. The screen displayed on the display shown in FIG. 4 will be described below in detail. The input device may include a keyboard and a pointing device (e.g., mouse).

For example, the management network 105 is a local area network (LAN). However, another kind of network may be used.

FIG. 20 is a block diagram showing a hardware configuration of the storage system 103 according to the first embodiment of this invention.

The storage system 103 includes a controller 140 for communicating with the host 101 and the storage management device 104 to control data I/O in the storage device 121 or the like.

The controller 140 includes a processor 141, a memory 142, a cache memory 143, a host interface (I/F) 144, a management I/F 145, and a drive I/F 146 connected to one another.

The processor 141 executes a program stored in the memory 142.

For example, the memory 142 is a semiconductor memory for storing the program executed by the processor 141 and data referred to by the program. The memory 142 of the embodiment stores the command reception module 111, the cache management module 112, the queuing judgment module 113, the queuing processing module 114, the queuing control module 115, the address conversion module 116, the drive control module 117, the queuing permission judgment table 131, and the queuing management table 132.

The memory 142 may further store an I/O command judged to be a queuing target.

The cache memory 143 is a semiconductor memory for temporarily storing data written in the storage device 121 or the like or data read from the storage device 121 or the like to achieve a high speed of data I/O processing. When high-speed processing is not required, the storage system 103 does not need to include a cache memory 143. Even in such the case, the embodiment can be realized.

The host I/F 144 is an interface for communicating with the host 101 through the network 102.

The management I/F 145 is an interface for communicating with the storage management device 104 through the management network 105.

The drive I/F 146 is an interface for executing data writing or reading in the storage device 121 or the like according to an instruction from the drive control module 117.

According to the embodiment, the command reception module 111, the cache management module 112, the queuing judgment module 113, the queuing processing module 114, the queuing control module 115, the address conversion module 116, and the drive control module 117 are programs executed by the processor 141. However, even when theses are constituted as dedicated hardware, the embodiment can be realized.

FIG. 19 is a flowchart showing a process executed by the cache management module 112 according to the first embodiment of this invention.

Upon reception of an I/O command from the host 101 at the command reception module 111, the cache management module 112 judges a cache hit (1901). In other words, the cache management module 112 judges whether a cache corresponding to the received I/O command is present or not in the cache memory 143.

When the cache hit is judged in Step 1901, the cache management module 112 refers to the cache to return data to the host 101 (1902). In this case, the queuing judgment module 113 does not execute the process shown in FIG. 2.

When a cache miss is judged in Step 1901, the cache management module 112 sends the received I/O command to the queuing judgment module 113 (1903). The queuing judgment module that has received the I/O command executes the process shown in FIG. 2.

Figure 2:
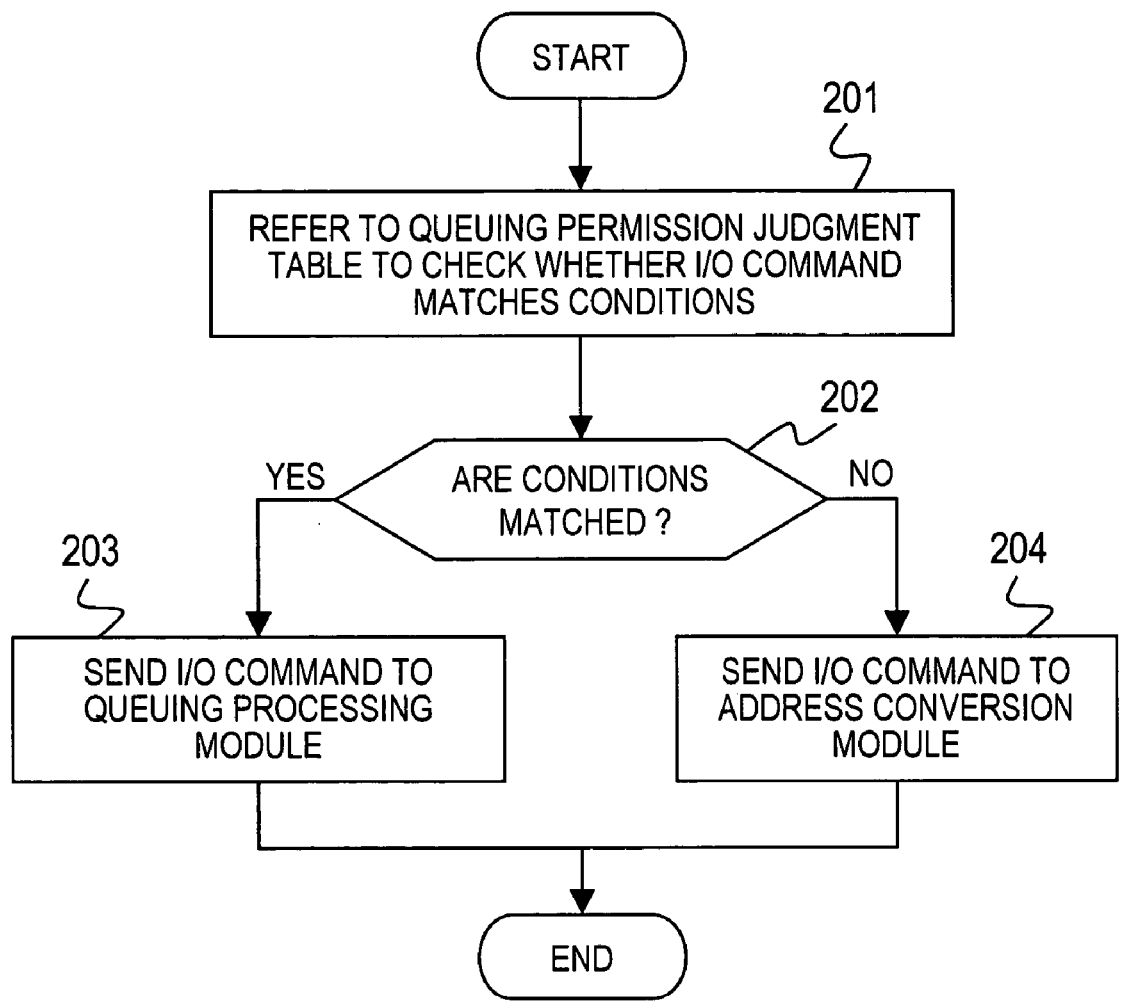
FIG. 2 is a flowchart showing a process executed by a queuing judgment module according to the first embodiment of this invention.

When the storage system 103 includes no cache memory 143, the process of FIG. 19 is not executed, but the process of FIG. 2 is executed for all the I/O commands.

FIG. 2 is a flowchart showing the process executed by the queuing judgment module 113 according to the first embodiment of this invention.

The queuing judgment module 113 first refers to the queuing permission judgment table 131 to check whether the received I/O command satisfies conditions set in the queuing permission judgment table 131 or not (201). The queuing permission judgment table 131 shown in FIG. 3 and referred to in this case will be described below in detail.

Next, the queuing judgment table 113 judges whether the I/O command satisfies the conditions or not based on the checking result of Step 201 (202).

The process executed in Steps 201 and 202 by the queuing judgment module 113 of the embodiment shown in FIG. 5 will be described below in detail.

If it is judged in Step 202 that the conditions are not satisfied, the received I/O command is not a queuing target. In this case, the queuing judgment module 113 sends the I/O command to the address conversion module 16 (204).

The address conversion module 116 converts an LUN or the like designated by the I/O command into a physical address, and sends the address to the drive control module 117. The drive control module 117 executes I/O command (data writing or reading) in received order with respect to the physical addresses. When the I/O command directly designates a physical address, the processing of the address conversion module 116 is omitted. In this case, in step 204, the I/O command is sent to the drive control module 117.

On the other hand, if it is judged in Step 202 that the conditions are satisfied, the received I/O command is a queuing target. In this case, to execute queuing, the queuing judgment module 113 sends the I/O command to the queuing processing module 114 (203).

The queuing processing module 114 refers to the queuing management table 132 to execute queuing for a predetermined time or a predetermined number of I/O commands. The queuing processing module 114 of the embodiment performs queuing by storing I/O commands judged to be queuing targets in the memory 142. However, these I/O commands may be stored in another memory or storage system. The queuing management table 132 shown in FIG. 6 will be described below in detail. The queuing processing module 114 rearranges the I/O commands stored by the queuing to shorten a sum total of execution time, and then executes the I/O commands in rearranged order. Specifically, the stored I/O commands are sent to the address conversion module 116 in the rearranged order. The process executed by the address conversion module 116 and the drive control module 117 is similar to that of Step 204.

The drive control module 117 preferably executes the rearranged I/O commands continuously in the rearranged order. In other words, preferably, the drive control module 117 should not execute I/O commands not targeted to be rearranged from execution of a first I/O command to execution of a last I/O command among the plurality of rearranged I/O commands.

After all, the I/O commands judged not to satisfy the conditions in Step 202 are executed in the received order (204). On the other hand, the I/O commands judged to satisfy the conditions in Step 202 are stored and executed in the rearranged order (203). Then, the process is finished.

The queuing processing module 114 can rearrange the I/O commands by the same method as that of the conventional case. The rearrangement of the I/O commands executed by the queuing processing module 114 will be described below.

For example, the queuing processing module 114 may rearrange the received I/O commands so that addresses (e.g., LBA) designated by the I/O addresses can be set in ascending order. As a specific example, a case where the command reception module 111 sequentially receives I/O commands designating addresses "1", "4", "2", and "3" and these four I/O commands are caused to queue will be described. The queuing processing module 114 rearranges the I/O commands in the order of "1", "2", "3", and "4". Areas of the storage device 121 or the like having addresses "1", "2", "3", and "4" are continuously arranged physically in the order of the addresses. Accordingly, by executing the commands in the rearranged order, rotational delay and seek time of the storage device 121 or the like are minimized to shorten a sum total of execution time of the four commands.

The queuing processing module 114 may rearrange the I/O commands to execute processing of the plurality of storage devices 121 or the like in parallel. For example, when one LU is set in both of the storage devices 121 and 122, areas corresponding to addresses "1" and "2" belong to the storage device 121, and areas corresponding to addresses "3" and "4" belong to the storage device 122, the queuing processing module 114 rearranges the four I/O commands in the order of "1", "3", "2", and "4". In this case, processing is executed sequentially for the addresses "1" and "2" in the storage device 121 and, in parallel with this, processing is sequentially executed for the addressees "3" and "4" in the storage device 122. As a result, it possible to shorten a sum total of execution time of the four commands.

FIG. 3 is an explanatory diagram of a queuing permission judgment table according to the first embodiment of this invention.

A queuing permission judgment table 301 shown in FIG. 3 corresponds to the queuing permission judgment table 131 shown in FIG. 1.

The queuing permission judgment table 301 includes an item number 311, a host LU number 312, an LBA 313, and a size 314.

The item number 311 is a serial number for uniquely identifying each entry (line) of the queuing permission judgment table 301.

The host LU number 312, the LBA 313, and the size 314 are fields for designating areas to which I/O queuing attributes are assigned. The I/O queuing attributes are attributes assigned to an optional range among the areas of the storage device 121 or the like for storing data by the system administrator. As described below, an I/O command issued by designating an area having a queuing attribute assigned thereto is judged to be a queuing target.

The host LU number 312 is a number (LUN) assigned to the LU to provide the LU including the area having the I/O queuing attribute assigned thereto to the host 101.

The LBA 313 is an address (LBA) of a logical block at a start point of the area having the I/O queuing attribute assigned thereto.

The size 314 is a size of the area having the I/O queuing attribute assigned thereto.

An asterisk "*" displayed in each of the sections of the LBA 313 and the size 314 means that there is no value set in each of the LBA 313 and the size 314. In this case, I/O queuing attributes are assigned to the entire LU set in the host LU number 312.

In the example of FIG. 3, a host LU number 312, an LBA 313, and a size 314 of a line where the item number 311 is "1" are respectively "1", "*", and "*". This means that I/O queuing attributes are assigned to the entire LU whose LUN is "1".

On the other hand, in the example of FIG. 3, a host LU number 312, an LBA 313, and a size 314 of a line where the item number 311 is "2" are respectively "2", "0", and "128". This means that I/O queuing attributes are assigned to 128 logical blocks having LBA of "0" to "127" assigned thereto in an LU whose LUN is "2".

FIG. 3 shows the example of designating the areas based on the LUN, the LBA, and the size. However, areas to which I/O queuing attributes assigned by another method may be designated. For example, LBA's at start and end points of the areas to which I/O queuing attributes are assigned may be designated. Alternatively, a VG, or a storage device 121, or the like to which I/O queuing attributes are assigned may be designated.

FIG. 4 is an explanatory diagram of a queuing permission judgment table setting screen according to the first embodiment of this invention.

A queuing permission judgment table setting screen 401 shown in FIG. 4 is a screen displayed in the display of the storage management device 104 to set the queuing permission judgment table 301 shown in FIG. 3. The queuing permission judgment table setting screen 401 includes a host LU number input field 411, an LBA input field 412, a size input field 413, a queuing permission judgment table display field 414, a load button 415, a save button 416, and a delete button 417.

The host LU number input field 411, the LBA input field 412, and the size input field 413 are fields for inputting values to be set in a host LU number 312, an LBA 313, and a size 314.

A value having been set in the queuing permission judgment table 301 is displayed in the queuing permission judgment table display field 414. When the system administrator selects one of the lines and operate the load button 415, values set in the line are displayed in the host LU number input field 411, the LBA input field 412, and the size input field 413. FIG. 4 shows an example where a line of an item number "2" is selected. The line selection and the button operation may be executed by e.g., clicking the mouse (similarly in FIGS. 7, 8, 12, and 17).

The system administrator can edit values to be set in the queuing permission judgment table 301 by changing the values displayed in the input fields. Subsequently, when the system administrator operates the save button 416, values displayed in the input fields at this time are set in the queuing permission judgment table 301.

The system administrator can add a line having a new value set by selecting a blank line displayed in the queuing permission judgment table display field 414 and inputting values to the input fields.

On the other hand, the system administrator can delete a line by selecting the line which has been set and operating the delete button 417.

Figure 5:
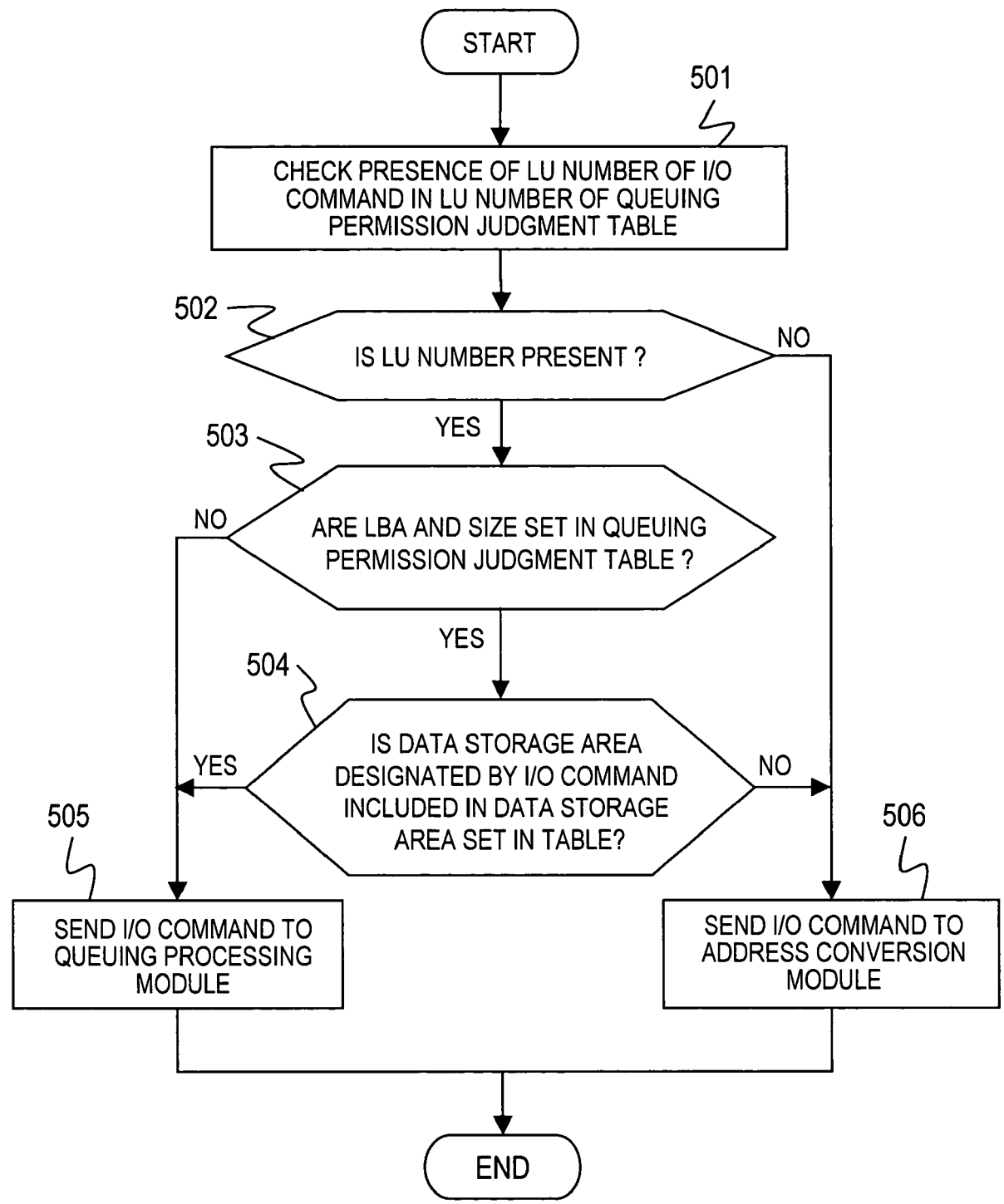
FIG. 5 is a flowchart showing a detailed process executed by the queuing judgment module according to the first embodiment of this invention.

FIG. 5 is a flowchart showing a detailed process executed by the queuing judgment module 113 according to the first embodiment of this invention.

Among Steps shown in FIG. 5, Steps 501 to 504 show the process executed in Steps 201 and 202 of FIG. 2. Steps 505 and 506 are similar to Steps 203 and 204 of FIG. 2, and thus description thereof will be omitted.

First, the queuing judgment module 113 refers to a queuing permission judgment table 301 to check whether an LUN designated by a received I/O command (i.e., LUN to which data is to be written and read based on the I/O command) has been set as a host LU number 312 or not (501).

Next, the queuing judgment module 113 judges whether an LUN designated by the received I/O command has been set or not based on the checking result of Step 501.

If "not set (i.e., NO)" is judged in Step 502, no I/O queuing attributes are assigned to an area designated by the received I/O command. In other words; the received I/O command is not a queuing target. In this case, the process proceeds to step 506.

On the other hand, if "set (i.e., YES)" is judged in Step 502, there is a possibility that I/O queuing attributes have been assigned to the area designated by the received I/O command. In this case, the queuing judgment module 113 judges whether an LBA 313 and a size 314 have been set or not in the queuing permission judgment table 301 (503). Specifically, the queuing judgment module 113 judges whether values other than "*" have been set or not in the LBA 313 and the size 314 corresponding to the same host LU number 312 as that of the LUN designated by the received I/O command.

If "not set (i.e., NO)" is judged in Step 503, I/O queuing attributes have been assigned to the entire LU designated by the received I/O command. In other words, the received I/O command is a queuing target. In this case, the process proceeds to Step 505.

On the other hand, if "set (i.e., YES)" is judged in Step 503, I/O queuing attributes have been assigned to areas designated by the LBA 313 and the size 314 in the LU designated by the received I/O command. Thus, the queuing judgment module 113 judges whether the area designated by the I/O command is included or not in the areas indicated by the LBA 313 and the size 314 (504).

If "included (i.e., YES)" is judged in Step 504, I/O queuing attributers have been assigned to the area designated by the I/O command. In other words, the received I/O command is a queuing target. In this case, the processing proceeds to Step 505.

On the other hand, if "not included (i.e., NO)" is judged in Step 504, no I/O queuing attribute has been assigned to the area designated by the I/O command. In other words, the received I/O command is not a queuing target. In this case, the process proceeds to Step 506.

The "NO" judgment in Step 503 and the "YES" judgment in Step 504 correspond to the case of judgment that the conditions are satisfied in Step 202 of FIG. 2. On the other hand, the "NO" judgment in Step 502 and the "NO" judgment in Step 504 correspond to the case of judgment that the conditions are not satisfied in Step 202 of FIG. 2.

For example, when the command reception module 111 receives an I/O command designating a logical block of LU whose LUN is "1", the queuing judgment module 113 refers to the queuing permission judgment table 301 (501). As "1" is set in the host LU number 312, and no values are set in the corresponding LBA 313 and size 314, in Steps 502 and 503, "YES" and "NO" are respectively judged to execute Step 505.

On the other hand, when the command reception module 111 receives an I/O command designating an area where an LBA is "256" and a size is "16" in LU having an LUN "2", the queuing judgment module 113 refers to the queuing permission judgment table 301 (501). "2" is set in the host LU number 312, "0" is set in a corresponding LBA 313, and "128" is set in a corresponding size 314. In this case, the area designated by the I/O command where the LBA is "256" and the size is "16" is not in a range from "0" to "127". Thus, in Steps 502, 503, and 504, "YES", "YES", and "NO" are respectively judged to execute Step 506.

When the area designated by the I/O command is not completely included in the area designated by the queuing permission judgment table (i.e., a part of the area designated by the I/O command is included), "NO" is judged in Step 504. For example, when an I/O command designating an area where an LBA is "120" and a size is "16" in LU having LUN "2", "YES", "YES", and "NO" are respectively judged in Steps 502, 503, and 504 to execute Step 506.

FIG. 6 is an explanatory diagram of a queuing management table according to the first embodiment of this invention.

A queuing management table 601 shown in FIG. 6 corresponds to the queuing management table 132 shown in FIG. 1. The queuing management table 601 is a table for setting queuing to be executed by the queuing processing module 114.

The queuing management table 601 includes an item number 611, a time 612, and a command number 613.

The item number 611 corresponds to the item number 311 of the queuing permission judgment table 301. A line where a value of the item number 611 is "1" corresponds to the line of FIG. 3 where the value of the item number 311 is "1". A line where a value of the item number 611 is corresponds to all among the lines of the queuing permission judgment table 301 which do not correspond to lines other than those having values "*" of the item number 611. In the examples of FIGS. 3 and 6, the line having a value "*" of the item number 611 of FIG. 6 corresponds to the line where the value of the item number 311 of FIG. 3 is not "1".

The time 612 is time for executing queuing. In other words, queuing is executed for I/O commands for time set in the time 612.

The command number 613 is the number of commands to be subjected to queuing. In other words, the number of I/O commands set in the command number 613 is subjected to queuing.

For example, in a first line of FIG. 6, "1" and "10 ms" are respectively set in the item number 611 and the time 612. This means that when a received I/O command satisfies the conditions set in the line of the value "1" set in the item number 311 of FIG. 3, queuing is executed for the I/O command for 10 milliseconds (ms). In other words, the queuing processing module 114 stores I/O commands received in 10 ms by queuing, and optimally rearranges the I/O commands to execute them.

In a second line of FIG. 6, "*" and "16" are respectively set in the item number 611 and the command number 613. This means that when received I/O commands satisfy the conditions set in the line other than that of the item number "1" of FIG. 3, 16 I/O commands are subjected to queuing. In other words, the queuing processing module 114 stores 16 I/O commands by queuing, and optimally rearranges the I/O commands to execute them.

FIG. 7 is an explanatory diagram of a queuing management table setting screen according to the first embodiment of this invention.

A queuing management table setting screen 701 shown in FIG. 7 is a screen displayed in the display of the storage management device 104 to set the queuing management table 601 shown in FIG. 6. The queuing management table setting screen 701 includes an item number input field 711, a time input field 712, a command number input field 713, a queuing management table display field 714, a load button 715, a save button 716, and a delete button 717.

The item number input field 711, the time input field 712, and the command number input field 713 are fields for inputting values to be set in an item number 611, a time 612, and a command number 613.

A value having been set in the queuing management table 601 is displayed in the queuing management table display field 714.

FIG. 7 shows an example where a line of an item number "1" is selected in the queuing management table display field 714.

A method of using a load button 715, a save button 716, and a delete button 717 is similar to that of using the load button 415, the save button 416, and the delete button 417 of FIG. 4. A method of setting values in the queuing permission judgment table setting screen 601 by using these buttons is as shown in FIG. 4. Thus, description of these methods will be omitted.

According to the first embodiment of this invention, judgment is made as to whether or not queuing for the I/O command is executed based on the area designated by the received I/O command.

For example, when the host 101 executes a plurality of applications, and when one of the applications is executed, response time may be required to be shortened, and the improvement of throughput may be required when another application is executed. In such the case, the system administrator presets an area to be used by the latter application in the queuing permission judgment table 301.

The queuing judgment module 113 of the embodiment judges that the I/O command is not a queuing target when the area designated by the received I/O command is an area used by the former application. On the other hand, when the area designated by the received I/O command is an area used by the latter application, the queuing judgment module 113 of the embodiment judges that the I/O command is a queuing target. As a result, it is possible to realize the performance desired for each application.

Next, a second embodiment of this invention will be described.

A configuration of a computer system of the second embodiment of this invention is similar to that of the first embodiment except for the contents set in a queuing permission judgment table 131 and a process executed by a queuing judgment module 113. Only differences of the second embodiment from the first embodiment will be described below.

FIG. 8 is an explanatory diagram of a queuing permission judgment table according to the second embodiment of this invention.

A queuing permission judgment table 801 shown in FIG. 8 corresponds to the queuing permission judgment table 131 shown in FIG. 1.

The queuing permission judgment table 801 includes an item number 811, a WWN 812, and a host LU number 813.

The item number 811 is a serial number for uniquely identifying each entry (line) of the queuing permission judgment table 801.

The WWN 812 is a world wide name for uniquely identifying a host 101. When a network 101 is a SAN, the host 101 (more accurately, port of HBA for connecting the host 101 to the network 102) is uniquely identified by the WWN. However, when the network 102 is an IP network, an IP address or a MAC address may be set in place of the WWN 812.

The host LU number 813 is an LUN designated by an I/O command judged to be a queuing target. In other words, when the host 101 having a WWN set in the WWN 812 issues an I/O command designating an LUN set in the host LU number 813, the I/O command is judged to be a queuing target. The host LU number 813 is an LUN provided to the host 101 as in the case of the host LU number 312. When the host LU number 813 is "*", the I/O command is judged to be a queuing target irrespective of an LUN designated by the I/O command.

In the example of FIG. 8, the WWN 812 and the host LU number 813 corresponding to a value "1" of the item number 811 are respectively "01:02:03:04:05:06:07:08" and "*". This means that an I/O command issued by the host 101 equipped with a port having a WWN of "001:02:03:04:05:06:07:08" is judged to be a queuing target irrespective of an LUN designated by the I/O command. The WWN 812 and the host LU number 813 corresponding to a value "2" of the item number 811 are respectively "01:02:03:04:05:06:07:09" and "0". This means that an I/O command issued by the host 101 equipped with a port having a WWN of "01:02: 03:04:05:06:07:09" by designating an LUN "0" is judged to be a queuing target.

FIG. 9 is an explanatory diagram of a queuing permission judgment table setting screen according to the second embodiment of this invention.

A queuing permission judgment table setting screen 901 shown in FIG. 9 is a screen displayed in the display of the storage management device 104 to set the queuing permission judgment table 801 shown in FIG. 8. The queuing permission judgment table setting screen 901 includes a WWN input field 911, a host LU number input field 912, a queuing permission judgment table display field 913, a load button 914, a save button 915, and a delete button 916.

The WWN input field 911 and the host LU number input field 912 are fields for inputting values to be set in a WWN 812 and a host LU number 813.

A value having been set in the queuing permission judgment table 801 is displayed in the queuing permission judgment table display field 913.

FIG. 9 shows an example where a line of an item number "2" is selected in the queuing management table display field 913.

A method of using a load button 914, a save button 915, and a delete button 916 is similar to that of using the load button 415, the save button 416, and the delete button 417 of FIG. 4. A method of setting values in the queuing permission judgment table setting screen 901 by using these buttons is as shown in FIG. 4. Thus, description of these methods will be omitted.

Figure 10:
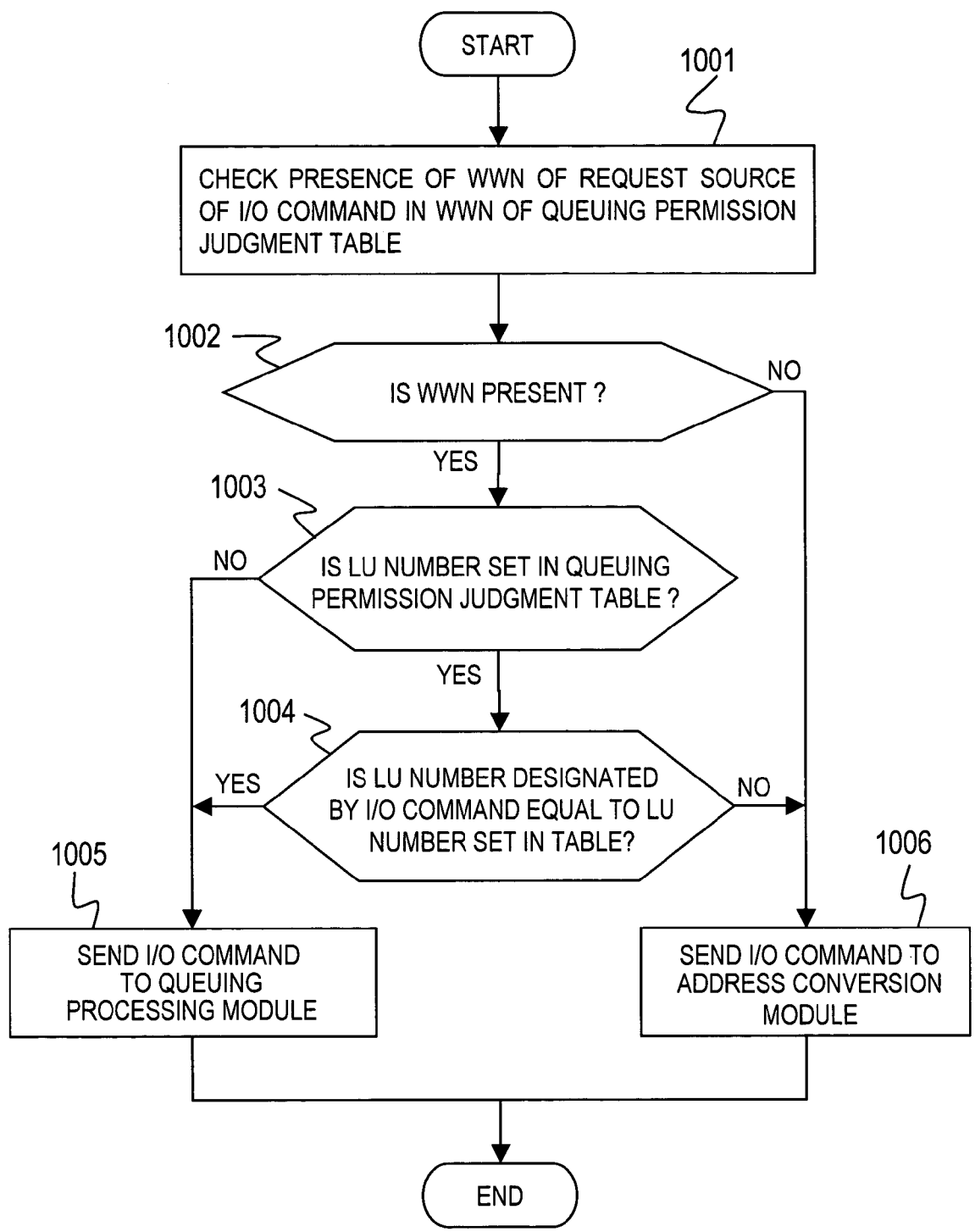
FIG. 10 is a flowchart showing a detailed process executed by a queuing judgment module according to the second embodiment of this invention.

FIG. 10 is a flowchart showing a detailed process executed by the queuing judgment module 113 according to the second embodiment of this invention.

The queuing judgment module 113 of the second embodiment of this invention executes the process shown in FIG. 2 as in the case of the queuing judgment module 113 of the first embodiment. However, a specific process executed in Steps 201 and 202 by the queuing judgment module 113 of the second embodiment is different from that of the first embodiment.

Among Steps shown in FIG. 10, Steps 1001 to 1004 show the process executed in Steps 201 and 202 of FIG. 2 by the queuing judgment module 113 of the second embodiment in detail. Steps 1005 and 1006 are similar to Steps 203 and 204 of FIG. 2, and thus description thereof will be omitted.

First, the queuing judgment module 113 refers to a queuing permission judgment table 801 to check whether a WWN of a request source of a received I/O command (i.e., WWN of a port of HBA of the host 101 which has issued the I/O command) has been set as a WWN 812 or not (1001).

Next, the queuing judgment module 113 judges whether the WWN of the request source has been set as a WWN 812 or not based on the checking result of Step 1001 (1002).

If "not set (i.e., NO)" is judged in Step 1002, the received I/O command is not a queuing target. In this case, the process proceeds to Step 1006.

On the other hand, if "set (i.e., YES)" is judged in Step 1002, there is a possibility that the received I/O command is a queuing target. In this case, the queuing judgment module 113 judges whether a host LU number 813 has been set or not in the queuing permission judgment table 801 (1003). Specifically, the queuing judgment module 113 judges whether values other than "*" have been set or not in the host LU number 813 corresponding to the same WWN 812 as that designated by the received I/O command.

If "not set (i.e., NO)" is judged in Step 1003, the received I/O command is a queuing target irrespective of an LUN designated by the I/O command. In this case, the process proceeds to Step 1005.

On the other hand, if "set (i.e., YES)" is judged in Step 1003, judgment is made as to whether the I/O command is a queuing target or not based on the LUN designated by the received I/O command. Thus, the queuing judgment module 113 judges whether the LUN designated by the I/O command is equal or not to a value set as the host LU number 813 (1004).

If "equal (i.e., YES)" is judged in Step 1004, the received I/O command is a queuing target. In this case, the processing proceeds to Step 1005.

On the other hand, if "not equal (i.e., NO)" is judged in Step 1004, the received I/O command is not a queuing target. In this case, the process proceeds to Step 1006.

The "NO" judgment in Step 1003 and the "YES" judgment in Step 1004 correspond to the case of judgment that the conditions are satisfied in Step 202 of FIG. 2. On the other hand, the "NO" judgment in Step 1002 and the "NO" judgment in Step 1004 correspond to the case of judgment that the conditions are not satisfied in Step 202 of FIG. 2.

For example, when the command reception module 111 receives an I/O command designating a logical block of LU whose LUN is "1" from the host 101 identified by a WWN "01:02:03:04:05:06:07:08", the queuing judgment module 113 refers to the queuing permission judgment table 801 (1001). As "01:02:03:04:05:06:07:08" is set in the WWN 812, and "*" is set in a corresponding host LU number 813, in Steps 1002 and 1003, "YES" and "NO" are respectively judged to execute Step 1005.

On the other hand, for example, when the command reception module 111 receives an I/O command designating an LU whose LUN is "1" from the host 101 identified by a WWN "01:02:03:04:05:06:07:09", the queuing judgment module 113 refers to the queuing permission judgment table 801 (1001). As "01:02:03:04:05:06:07:09" is set in the WWN 812, and "0" is set as a corresponding host LU number 813, in Steps 1002, 1003, and 1004, "YES", "YES", and "NO" are respectively judged. In this case, Step 1006 is executed.

According to the second embodiment of this invention, judgment is made as to whether or not queuing for the I/O command is executed based on the host 101 which has issued the I/O command.

For example, the embodiment can be applied when the host 101 that mainly executes a process requiring high throughput and the host 101 that mainly executes a process requiring fast response use the storage system 103. In this case, by setting a WWN for identifying the former host in the WWN 812 of the queuing permission judgment table 801, I/O commands issued by the former host 101 are subjected to queuing, and are rearranged to be executed. On the other hand, I/O commands issued by the latter host 101 are immediately executed without queuing to shorten response time. As a result, it is possible to realize the performance desired for each host 101 which issues I/O commands.

On the other hand, the embodiment can be applied when one host 101 executes an application requiring high throughput and an application requiring fast response. In this case, by installing a plurality of host adapters or using a HBA equipped with a plurality of ports, a plurality of network interfaces are provided in the host 101. A WWN for identifying one of the plurality of interfaces is set in a WWN 812 of the queuing permission judgment table 801, and an LUN of an LU used by the former application is registered in the host LU number 813. The former application accesses the storage system 103 by using the interface having the WWN set in the queuing permission judgment table 801. As a result, the I/O commands alone issued by the former application are subjected to queuing, and are rearranged to be executed. The latter application accesses the storage system 103 by using the interface having a WWN other than the WWN set in the queuing permission judgment table 801. As a result, the I/O commands issued by the latter application are immediately executed without queuing to shorten response time. Thus, it is possible to realize the performance desired for each application which issues I/O commands.

Next, a third embodiment of this invention will be described.

A configuration of a computer system of the third embodiment of this invention is similar to that of the first embodiment except for the contents set in a queuing permission judgment table 131 and a process executed by a queuing judgment module 113. Only differences of the third embodiment from the first embodiment will be described below.

FIG. 11 is an explanatory diagram of a queuing permission judgment table according to the third embodiment of this invention.

A queuing permission judgment table 1101 shown in FIG. 11 corresponds to the queuing permission judgment table 131 shown in FIG. 1.

The queuing permission judgment table 1101 includes an item number 1111, a host LU number 1112, a priority 1113, and a range condition 1114.

The item number 1111 is a serial number for uniquely identifying each entry (line) of the queuing permission judgment table 1101.

In the host LU number 1112, the priority 1113, and the range condition 1114, values used as conditions for judging whether a received I/O command is a queuing target or not are set. Specifically, when an LU designated by the received I/O command is set in the LU number 1112, and priority set on the I/O command satisfies conditions established by the priority 1113 and the range condition 1114, the I/O command is judged to be a queuing target.

In the example of FIG. 11, "10", "09", and "equal to or less" are respectively set as the host LU number 1112, the priority 1113, and the range condition 1114 corresponding to a value "1" of the item number 1111. This means that when priority given to an I/O command designating an LU whose LUN is "10" is a value equal to or less than "09", the I/O command is judged to be a queuing target.

The values "*", "15", and "equal" are respectively set as the host LU number 1112, the priority 1113, and the range condition 1114 corresponding to a value "2" of the item number 1111. This means that when priority given to an I/O command designating an LU whose LUN is a value not set in the other item number 1111 (specifically, value other than "10" in the example of FIG. 11), the I/O command is judged to be a queuing target.

The value set in the range condition 1114 may be, e.g., "equal to or more", "larger", "smaller", or the like in addition to the value shown in FIG. 11.

FIG. 12 is an explanatory diagram of a queuing permission judgment table setting screen according to the third embodiment of this invention.

A queuing permission judgment table setting screen 1201 shown in FIG. 12 is a screen displayed in the display of the storage management device 104 to set the queuing permission judgment table 1101 shown in FIG. 11. The queuing permission judgment table setting screen 1201 includes a host LU number input field 1211, a priority input field 1212, a range condition input field 1213, a queuing permission judgment table display field 1214, a load button 1215, a save button 1216, and a delete button 1217.

The host LU number input field 1211, the priority input field 1212, and the range condition input field 1213 are fields for inputting values to be set in a host LU number 1112, a priority 1113, and a range condition 1114.

By operating a triangle in a right end of the range condition input field 1213, a value (e.g., "equal to or more", "equal to or less", "equal", or the like) to be set in the range condition 1114 may be displayed on a menu. In this case, the system administrator can select a value to be set in the range condition 1114 by selecting one of those displayed.

In the queuing permission judgment table display field 1214, a value that has been set in the queuing permission judgment table 1101 is displayed.

FIG. 12 shows an example where a line of an item number "1" is selected in the queuing permission judgment table display field 1214.

A method of using a load button 1215, a save button 1216, and a delete button 1217 is similar to that of using the load button 415, the save button 416, and the delete button 417 of FIG. 4. A method of setting a value in the queuing permission judgment table setting screen 1201 by using these buttons is as shown in FIG. 4. Thus, description of these methods will be omitted.

Figure 13:
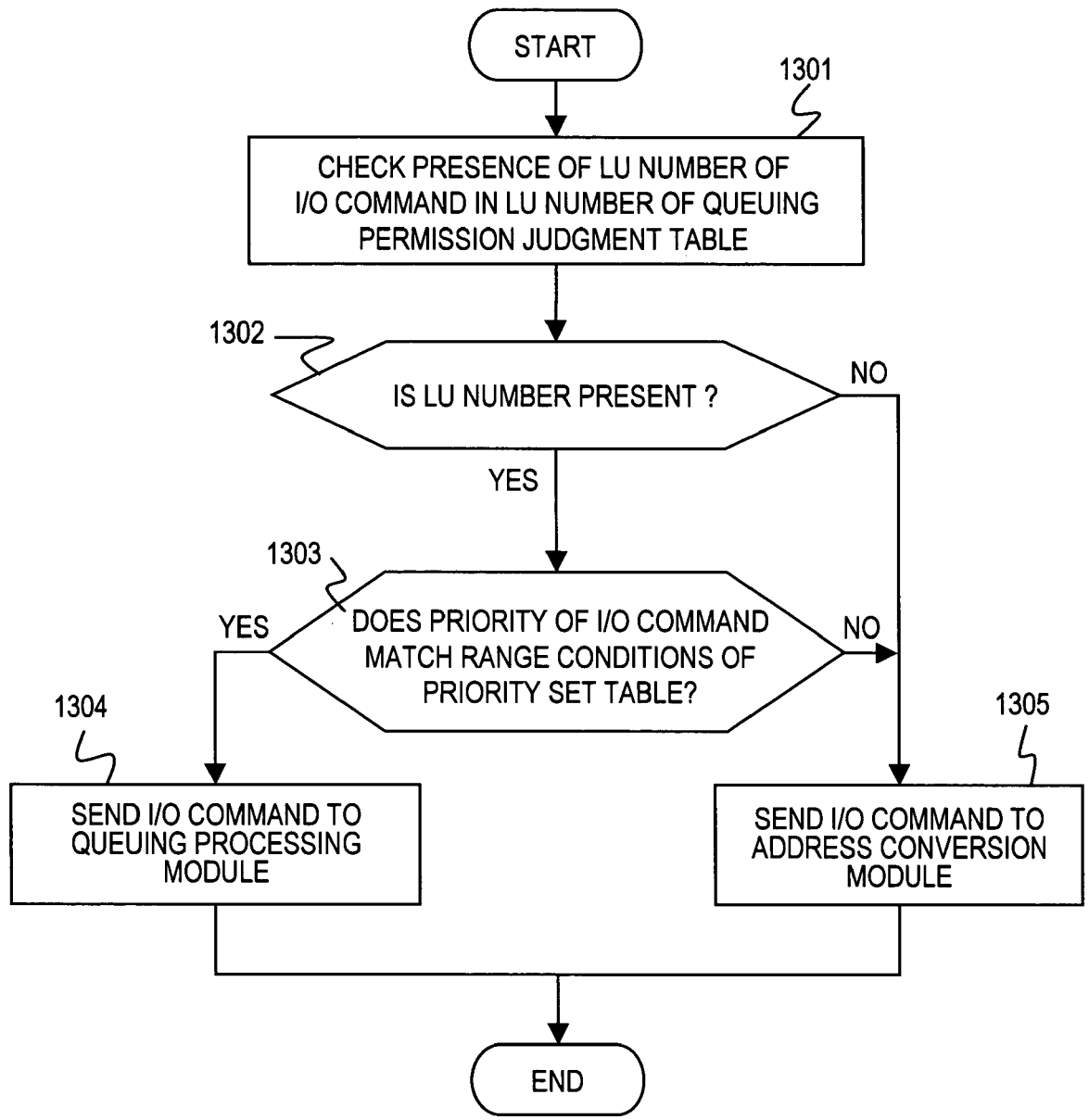
FIG. 13 is a flowchart showing a detailed process executed by a queuing judgment module according to the third embodiment of this invention.

FIG. 13 is a flowchart showing a detailed process executed by the queuing judgment module 113 according to the third embodiment of this invention.

The queuing judgment module 113 of the third embodiment of this invention executes the process shown in FIG. 2 as in the case of the queuing judgment module 113 of the first embodiment. However, a specific process executed in Steps 201 and 202 by the queuing judgment module 113 of the third embodiment is different from that of the first embodiment.

Among Steps shown in FIG. 13, Steps 1301 to 1303 show the process executed in Steps 201 and 202 of FIG. 2 by the queuing judgment module 113 of the third embodiment in detail. Steps 1304 and 1305 are similar to Steps 203 and 204 of FIG. 2, and thus description thereof will be omitted.

First, the queuing judgment module 113 refers to a queuing permission judgment table 1101 to check whether an LUN designated by a received I/O command has been set as a host LU number 1112 or not (1301).

Next, the queuing judgment module 113 judges whether the designated LUN has been set as a host LU number 1112 or not based on the checking result of Step 1301 (1302).

If "*" is set in the host LU number 1112, in Step 1302, "set" is always judged.

If "not set (i.e., NO)" is judged in Step 302, the received I/O command is not a queuing target. In this case, the process proceeds to Step 1305.

On the other hand, if "set (i.e., YES)" is judged in Step 1302, there is a possibility that the received I/O command is a queuing target. In this case, the queuing judgment module 113 judges whether or not priority given to the received I/O commands satisfies conditions set in the priority 1113 and the range condition 1114 (1303).

If "conditions not satisfied (i.e., NO)" is judged in Step 1303, the received I/O command is not a queuing target. In this case, the process proceeds to Step 1305.

On the other hand, if "conditions satisfied (i.e., YES)" is judged in Step 1303, the received I/O command is a queuing target. In this case, the process proceeds to Step 1304.

The "YES" judgment in Step 1303 corresponds to the case of judgment that the conditions are satisfied in Step 202 of FIG. 2. On the other hand, the "NO" judgment in Step 1302 and the "NO" judgment in Step 1303 correspond to the case of judgment that the conditions are not satisfied in Step 202 of FIG. 2.

For example, when the command reception module 111 receives an I/O command designating a logical block of LU whose LUN is "10" and priority given to the I/O command is "05", the queuing judgment module 113 refers to the queuing permission judgment table 1101 (1301). As "LUN 10" is set in the host LU number 1112, and corresponding priority 1113 and range condition 1114 are respectively "09" and "equal to or less", in Steps 1302 and 1303, "YES" and "YES" are respectively judged to execute Step 1304.

On the other hand, for example, when the command reception module 111 receives an I/O command designating an LU whose LUN is "5", the queuing judgment module 113 refers to the queuing permission judgment table 1101 if a value of the priority given to the I/O command is "10" (1301). As "*" is set in the host LU number 1112, and the corresponding priority 1113 and range condition 1114 are respectively "15" and "equal", in Steps 1302 and 1303, "YES" and "NO" are respectively judged to execute Step 1305.

According to the third embodiment of this invention, judgment is made as to whether or not queuing for the I/O command is executed based on the priority given to the I/O command.

Any priority can be given to the I/O command. For example, when a SCSI protocol is applied to the network 102 of the embodiment, priority of the embodiment may be priority set in a SCSI command. Alternatively, the priority of the embodiment may be an optional value set by an application.

Next, a fourth embodiment of this invention will be described.

Figure 14:
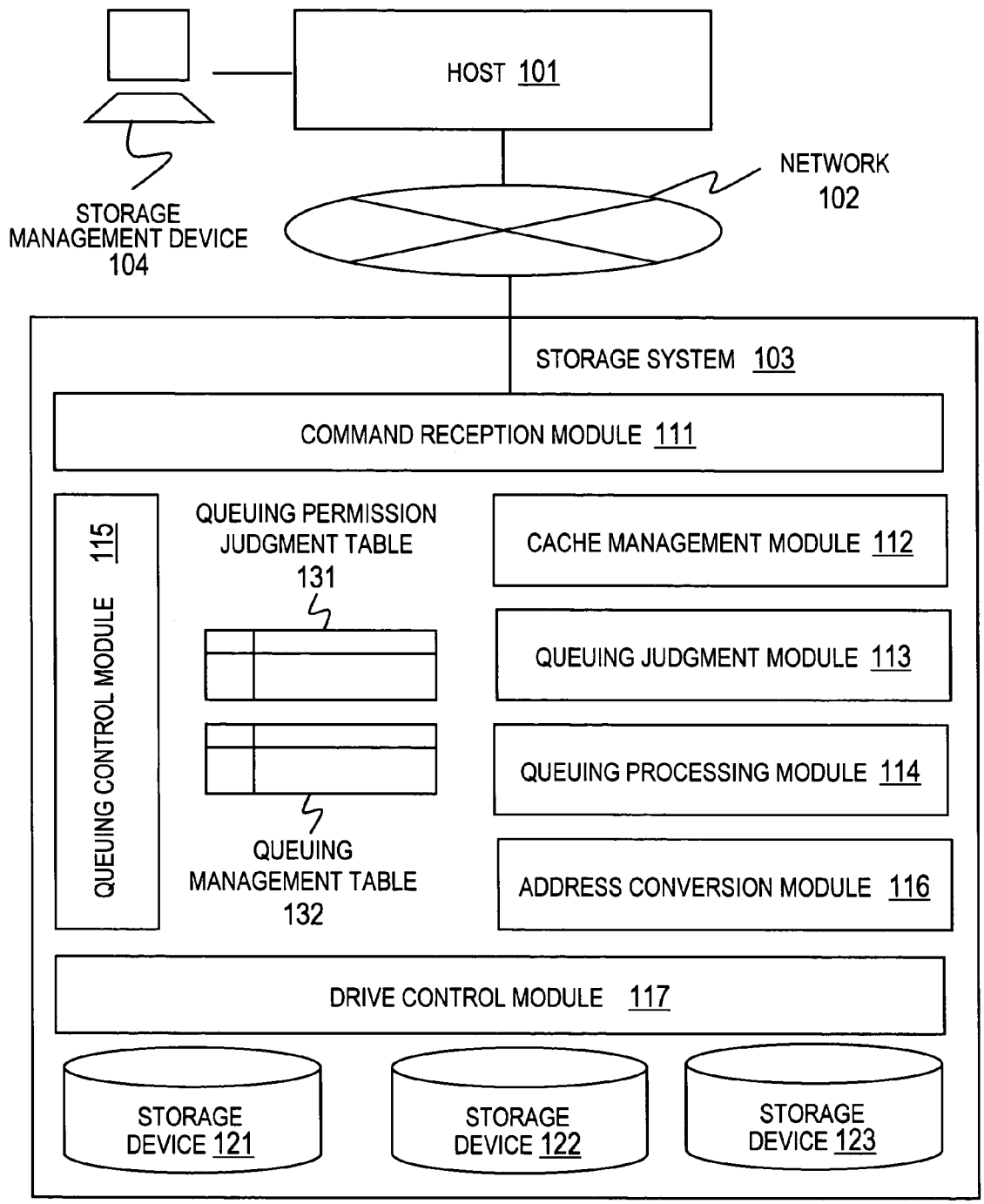
FIG. 14 is a block diagram showing a configuration of a computer system according to a fourth embodiment of this invention.

FIG. 14 is a block diagram showing a configuration of a computer system according to the fourth embodiment of this invention.

Different from the first to third embodiments, in the computer system of the fourth embodiment, a storage management device 104 is connected to a host 101. Accordingly, the storage management device 104 of the embodiment sets a queuing permission judgment table 131 and a queuing management table 132 through the host 101 and a network 102. A storage system 103 receives not only an I/O command issued from the host 101 through the network 102 but also a queuing control command issued from the storage management device 104. Other points of the fourth embodiment are similar to those of the first to third embodiments.

Only differences of the fourth embodiment from the first to third embodiments will be described below.

Figure 15:
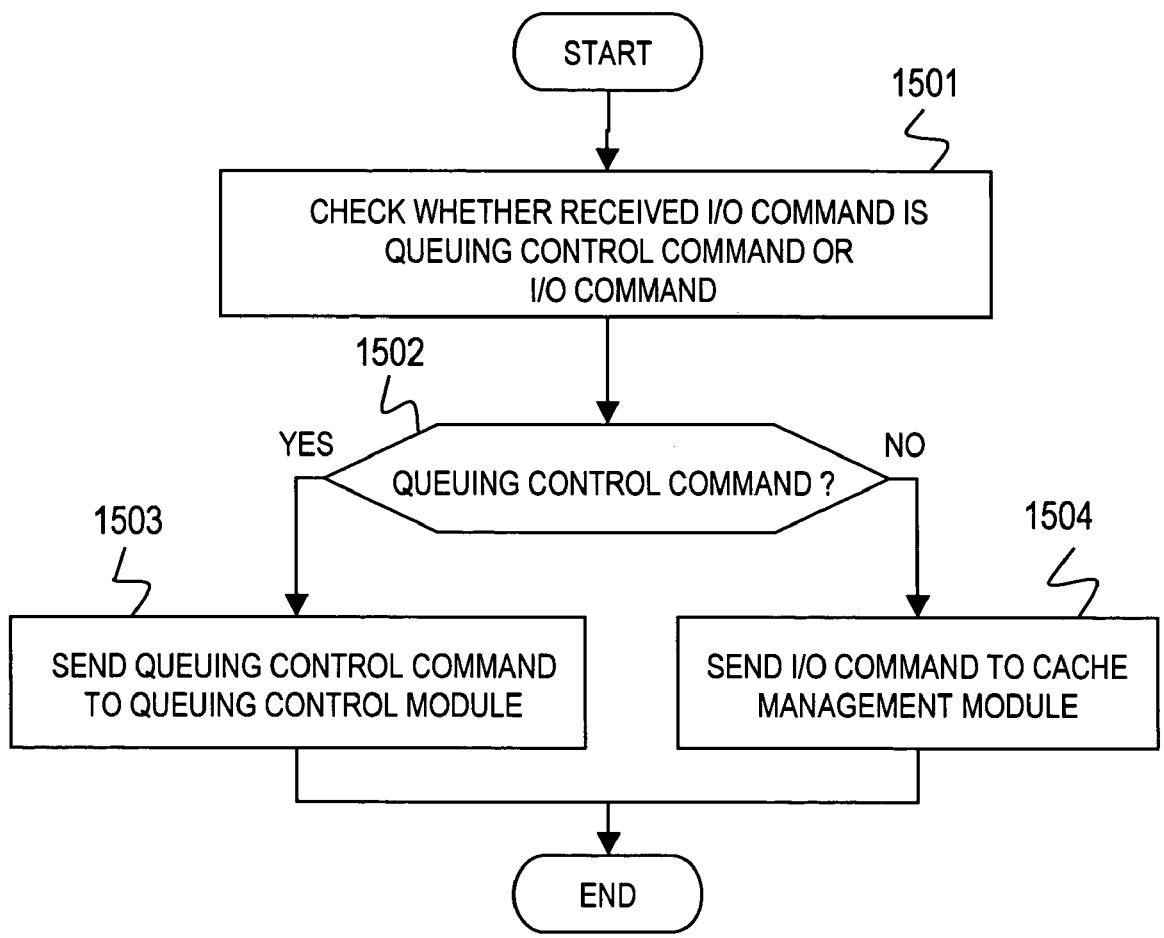
FIG. 15 is a flowchart showing a process executed by a command reception module according to the fourth embodiment of this invention.

FIG. 15 is a flowchart showing a process executed by a command reception module 111 according to the fourth embodiment of this invention.

The command reception module 111 first checks which of a queuing control command and an I/O command a received command is (1501).

Next, the command reception module 111 judges whether the received command is a queuing control command or not based on the checking result of Step 1501 (1502).

If the received command is judged to be a queuing control command in Step 1502, the command reception module 111 sends the received queuing control command to a queuing control module 115 (1503). The queuing control module 115 executes the queuing control command to set a queuing permission control table 131 or a queuing management table 132.

On the other hand, if the received command is judged not to be a queuing control command in Step 1502 (i.e., received command is an I/O command), the command reception module 111 sends the received I/O command to a cache management module 112 (1503). A process executed by the cache management module 112 is as shown in FIG. 19. A subsequent process executed by a queuing judgment module 113 may be similar to that of each of the first to third embodiments or a fifth embodiment to be described.

According to the fourth embodiment of this invention, the storage management device 104 can start or release execution of queuing by optional timing. For example, when a queuing control command is issued to target I/O commands which satisfy predetermined conditions for queuing at a given point, I/O commands received by the command reception module 111 after the queuing control command become queuing targets if the set conditions are satisfied. Subsequently, when a queuing control command is issued to remove the I/O commands which satisfy the conditions from the queuing target, I/O commands received by the command reception module 111 after the queuing control command are not targeted for queuing even if the same conditions are satisfied.

FIG. 14 shows the case where the storage management device 104 is connected to the host 101. However, the host 101 and the storage management device 104 may be physically realized by one computer. For example, a storage management program (not shown) may be stored in a memory (not shown) of the host 101, and a processor (not shown) of the host 101 may execute the storage management program to issue a queuing control command to the storage system 103. Alternatively, an application of the host 101 may issue a queuing control command.

The fourth embodiment of this invention can be applied to a case of switching between execution and nonexecution of queuing based on time. For example, before a database processing program (not shown) which is an application of the host 101 executes a process of issuing a large amount of I/O commands, a queuing control command may be issued, and a queuing permission judgment table 131 may be set to execute queuing for the I/O commands. Since I/O commands issued thereafter are subjected to queuing according to setting of the queuing permission judgment table 131 or the like, throughput is improved. After an end of the process, the database processing program may set the queuing permission judgment table 131 to prevent queuing of I/O commands issued thereafter.

Alternatively, the embodiment may be applied to a case where the host 101 executes a process requiring short response time at daytime, and a batch job requiring high throughput at night. In this case, before a start of the night process, the host 101 issues a queuing control command to set execution of queuing. Then, after an end of the night process, a queuing control command is issued to release the execution of queuing.

Thus, according to the fourth embodiment of this invention, since the host 101 can control queuing even without the storage management device 104, convenience is improved.

Next, a fifth embodiment of this invention will be described.

A configuration of a computer system of the fifth embodiment of this invention is similar to that of the first embodiment except for the contents set in a queuing permission judgment table 131 and a process executed by a queuing judgment module 113. Only differences of the fifth embodiment from the first embodiment will be described below.

FIG. 16 is an explanatory diagram of a queuing permission judgment table according to the fifth embodiment of this invention.

The queuing permission judgment table 1601 shown in FIG. 16 corresponds to the queuing permission judgment table 131 shown in FIG. 1.

The queuing permission judgment table 1601 includes an item number 1611, a host LU number 1612, and an LU number 1613.

The item number 1611 is a serial number for uniquely identifying each entry (line) of the queuing permission judgment table 1601.

The host LU number 1112 is an LUN provided to a host 101 so that a storage system 103 can receive I/O commands to be targeted for queuing.

The LU number 1613 is a real LUN corresponding to the host LU number 1112.

In the example of FIG. 16, "11" and "1" are respectively set as a host LU number 1612 and an LU number 1613 corresponding to a value "1" of the item number 1611. This means that LU whose LUN is "1" is provided as two LU's (i.e., LU whose LUN is "11" and LU whose LUN is "1") to the host 101. The host 101 issues an I/O command needed to be immediately executed by designating LUN "1". An I/O command which requires high throughput targeting the same LU is issued by designating LUN "10".

In the example of FIG. 16, "12" and "2" are respectively set as a host LU number 1612 and an LU number 1613 corresponding to a value "2" of the item number 1611. As in the case of the above, this means that LUN "12" is designated when the host 101 issues an I/O command to be targeted for queuing to an LU whose LUN is "2".

FIG. 17 is an explanatory diagram of a queuing permission judgment table setting screen according to the fifth embodiment of this invention.

A queuing permission judgment table setting screen 1701 shown in FIG. 17 is a screen displayed in the display of the storage management device 104 to set the queuing permission judgment table 1601 shown in FIG. 16. The queuing permission judgment table setting screen 1701 includes a host LU number input field 1711, an LU number input field 1712, a queuing permission judgment table display field 1713, a load button 1714, a save button 1715, and a delete button 1716.

The host LU number input field 1711 and the LU number input field 1712 are fields for inputting values to be set in a host LU number 1612 and an LU number 1613.

A value having been set in the queuing permission judgment table 1601 is displayed in the queuing permission judgment table display field 1713.

FIG. 17 shows an example where a line of an item number "2" is selected in the queuing management table display field 1713.

A method of using a load button 1714, a save button 1715, and a delete button 1716 is similar to that of using the load button 415, the save button 416, and the delete button 417 of FIG. 4. A method of setting values in the queuing permission judgment table setting screen 1701 by using these buttons is as shown in FIG. 4. Thus, description of these methods will be omitted.

Figure 18:
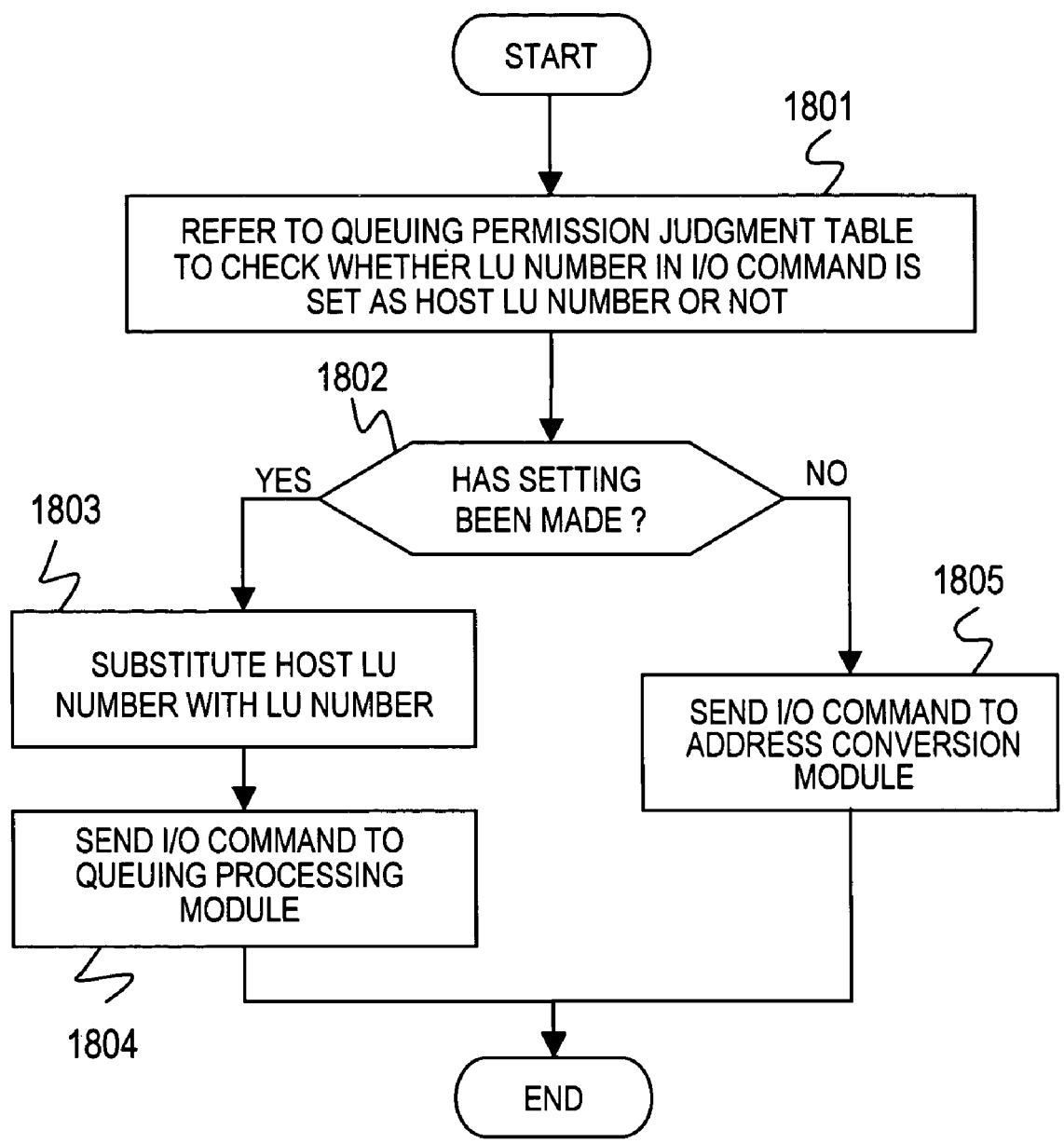
FIG. 18 is a flowchart showing a detailed process executed by a queuing judgment module according to the fifth embodiment of this invention.

FIG. 18 is a flowchart showing a detailed process executed by the queuing judgment module 113 according to the fifth embodiment of this invention.

The queuing judgment module 113 of the fifth embodiment of this invention executes the process shown in FIG. 2 as in the case of the queuing judgment module 113 of the first embodiment. FIG. 18 shows the process executed by the queuing judgment module 113 of the embodiment of FIG. 2 more in detail. Among Steps of FIG. 18, Steps 1804 and 1805 are similar to Steps 203 and 204 of FIG. 2, and thus description thereof will be omitted.

First, the queuing judgment module 113 refers to a queuing permission judgment table 1601 to check whether an LUN designated by a received I/O command has been set as a host LU number 1612 or not (1801).

Next, the queuing judgment module 113 judges whether the designated LUN has been set as a host LU number 1612 or not based on the checking result of Step 1801 (1802).

If "not set (i.e., NO)" is judged in Step 1802, the received I/O command is not a queuing target. In this case, the process proceeds to Step 1805.

On the other hand, if "set (i.e., YES)" is judged in Step 1802, the received I/O command is a queuing target. In this case, the queuing judgment module 113 substitutes a host LU number 1612 designated by the received I/O command with a value of an LU number 1613 corresponding to the LU number 1612 (1803). Subsequently, the process proceeds to Step 1804. As a result, the process of Step 1804 is executed by targeting an LU identified by the substituted value of the LU number 1613.

The "YES" judgment in Step 1802 corresponds to the case of judgment that the conditions are satisfied in Step 202 of FIG. 2. On the other hand, the "NO" judgment in Step 1802 corresponds to the case of judgment that the conditions are not satisfied in Step 202 of FIG. 2.

For example, when the command reception module 111 receives an I/O command designating an LU whose LUN is "10", the queuing judgment module 113 refers to the queuing permission judgment table 1601 (1801). As "10" is set in the host LU number 1612, in Step 1802, "YES" is judged. A value of the LU number 1613 set corresponding to the value "10" of the host LU number 1612 of the queuing permission judgment table 1601 is "1". Accordingly, the LUN "10" designated by the I/O command is substituted with "1". Then, Step 1804 is executed by targeting the LU whose LUN is "1".

On the other hand, for example, when the command reception module 111 receives an I/O command designating an LU whose LUN is "2", the queuing judgment module 113 refers to the queuing permission judgment table 1601 (1801). As "2" is not set in the host LU number 1612, in Step 1802, "NO" is judged. In this case, Step 1805 is executed by targeting the LU whose LUN is "2".

According to the fifth embodiment of this invention, one LU is provided as two LU's having different LUN's to the host 101. An I/O command issued by designating one LUN is subjected to queuing by the storage system 103. Accordingly, even in the case of issuing I/O commands to the same LU, when high throughput is required, the host 101 can exhibit desired performance by designating an LUN different from that when short response time is required. Similar effects can be expected by the third embodiment. However, the fifth embodiment is different from the third embodiment in that a plurality of network interfaces are not necessary.

What is claimed is:

1. A storage system which is coupled to a network and executes an I/O command received from at least one host computer through the network, comprising:

a host interface coupled to the network;
a processor coupled to the host interface;
a memory coupled to the processor; and a storage device in which data is read or written according to the I/O command, wherein:

the storage system holds judgment information including predetermined conditions set therein;

upon reception of the I/O command, the processor judges whether the received I/O command satisfies the predetermined conditions or not based on the judgment information;

the processor queues a plurality of I/O commands that satisfy the predetermined conditions;

the processor rearranges the plurality of queued I/O commands;

the processor executes the plurality of queued I/O commands in a rearranged order; and the processor executes I/O commands that do not satisfy the predetermined conditions in a received order.

2. The storage system according to claim 1, wherein the processor rearranges the plurality of queued I/O commands to shorten a sum total of execution time of the plurality of queued I/O commands.

3. The storage system according to claim 1, wherein:

the judgment information includes a predetermined range among areas for storing data set therein as the predetermined conditions;

the processor judges whether the received I/O command designate the predetermined range set in the judgment information or not; and the processor determines that the received I/O command satisfies the predetermined conditions when the received I/O command is judged to designate an area belonging to the predetermined range set in the judgment information.

4. The storage system according to claim 3, wherein the predetermined range is set based on at least one of a logical unit number, a logical block address, and a size.

5. The storage system according to claim 1, wherein:

the judgment information includes information for identifying at least one host computer that issues the I/O command set therein as the predetermined conditions;

the processor judges whether the information for identifying the host computer which has issued the received I/O command has been set or not in the judgment information; and the processor determines that the received I/O command satisfies the predetermined conditions when the information for identifying the host computer which has issued the received I/O command is judged to have been set in the judgment information.

6. The storage system according to claim 5, wherein the judgment information includes a world wide name set therein as the information for identifying the host computer.

7. The storage system according to claim 1, wherein:

the judgment information includes a range of priority set on the I/O command set therein as the predetermined conditions;

the processor judges whether the priority set on the received I/O command is included or not in a predetermined range set in the judgment information; and the processor determines that the received I/O command satisfies the predetermined conditions when the priority set on the received I/O command is judged to be included in the predetermined range set in the judgment information.

8. The storage system according to claim 1, wherein:

the judgment information includes a first identifier for identifying an area for storing data and a second identifier corresponding to the first identifier set therein as the predetermined conditions;

the processor judges whether the received I/O command designates the second identifier or not;

the processor determines that the received I/O command satisfies the predetermined conditions when the received I/O command is judged to designate the second identifier; and the processor executes the plurality of queued I/O commands in the area identified by the first identifier corresponding to the second identifier.

9. The storage system according to claim 1, wherein:

the storage system holds management information including at least one of a number of I/O commands which satisfy the predetermined conditions to be queued and time for queuing the I/O commands;

the processor queues the set number of I/O commands which satisfy the predetermined conditions when the number of the I/O commands to be queued is set in the management information; and the processor queues the I/O commands which satisfy the predetermined conditions for the set time when the time for queuing the I/O commands is set in the management information.

10. The storage system according to claim 1, further comprising a management interface coupled to a management network, wherein:

the storage system holds management information including at least one of a number of I/O commands which satisfy the predetermined conditions to be queued and time for queuing the I/O commands;

a management computer is coupled to the management interface; and the processor sets the judgment information and the management information according to an instruction received from the management computer.

11. The storage system according to claim 1, wherein:

the storage system holds management information including at least one of a number of I/O commands which satisfy the predetermined conditions to be queued and time for queuing the I/O commands; and the processor sets the judgment information and the management information according to a control command received from the host computer.

12. A method of controlling a storage system which is coupled to a network and executes an I/O command received from at least one host computer through the network, the storage system comprising:

a host interface coupled to the network;

a processor coupled to the host interface;

a memory coupled to the processor; and a storage device in which data is read or written according to the I/O command, wherein the storage system holds judgment information including predetermined conditions set therein, the method comprising:

judging, by the processor, upon reception of the I/O command, whether the received I/O command satisfies the predetermined conditions or not based on the judgment information, queuing, by the processor, a plurality of I/O commands that satisfy the predetermined conditions, rearranging, by the processor, the plurality of queued I/O commands, executing, by the processor, the plurality of queued I/O commands in a rearranged order; and executing, by the processor, I/O commands that do not satisfy the predetermined conditions in a received order.

13. The method according to claim 12, wherein the processor rearranges the plurality of queued I/O commands to shorten a sum total of execution time of the plurality of queued I/O commands.

14. The method according to claim 12, wherein the judgment information includes a predetermined range among areas for storing data set therein as the predetermined conditions, the method further comprising:
judging, by the processor, whether the received I/O command designates the predetermined range set in the judgment information or not; and
determining, by the processor, that the received I/O command satisfies the predetermined conditions when the received I/O command is judged to designate an area belonging to the predetermined range set in the judgment information.

15. The method according to claim 12, wherein the judgment information includes information for identifying at least one host computer that issues the I/O command set therein as the predetermined conditions, the method further comprising:
judging, by the processor, whether the information for identifying the host computer which has issued the received I/O command has been set or not in the judgment information; and
determining, by the processor, that the received I/O command satisfies the predetermined conditions when the information for identifying the host computer which has issued the received I/O command is judged to have been set in the judgment information.

16. The method according to claim 12, wherein the judgment information includes a range of priority set on the I/O command set therein as the predetermined conditions, the method further comprising:
judging, by the processor, whether the priority set on the received I/O commands is included or not in a predetermined range set in the judgment information; and
determining, by the processor, that the received I/O command satisfies the predetermined conditions when the priority set on the received I/O command is judged to be included in the predetermined range set in the judgment information.

17. The method according to claim 12, wherein the judgment information includes a first identifier for identifying an area for storing data and a second identifier corresponding to the first identifier set therein as the predetermined conditions, the method further comprising:
judging, by the processor, whether the received I/O command designates the second identifier or not;
determining, by the processor, that the received I/O command satisfies the predetermined conditions when the received I/O command is judged to designate the second identifier; and
executing, by the processor, the plurality of queued I/O commands in the area identified by the first identifier corresponding to the second identifier.

18. The method according to claim 12, wherein the storage system holds management information including at least one of a number of I/O commands which satisfy the predetermined conditions to be queued and time for queuing the I/O commands, the method further comprising:
queuing, by the processor, the set number of I/O commands which satisfy the predetermined conditions when the number of the I/O commands to be queued is set in the management information; and
queuing, by the processor, the I/O commands which satisfy the predetermined conditions for the set time when the time for queuing the I/O commands is set in the management information.

19. The method according to claim 12, wherein:
the storage system further comprises a management interface coupled to the network;
the storage system holds management information including at least one of a number of I/O commands which satisfy the predetermined conditions to be queued and time for queuing the I/O commands; and
a management computer is coupled to the management interface,
the method further comprising setting, by the processor, the judgment information and the management information according to an instruction received from the management computer.

20. The method according to claim 12, wherein the storage system holds management information including at least one of a number of I/O commands which satisfy the predetermined conditions to be queued and time for queuing the I/O commands,
the method further comprising setting, by the processor, the judgment information and the management information according to a control command received from the host computer.

* * * * *